United States Patent [19]

Booth

[11] Patent Number: 5,016,958

[45] Date of Patent: May 21, 1991

[54] OPTICAL SWITCH HAVING A PHASE CHANGE REGION THEREIN

[75] Inventor: Bruce L. Booth, West Chester, Pa.

[73] Assignee: E. I. du Pont de Nemours and Company, Wilmington, Del.

[21] Appl. No.: 307,059

[22] Filed: Feb. 7, 1989

[51] Int. Cl.$^5$ .............................................. G02F 1/00
[52] U.S. Cl. ............................... 350/96.13; 350/96.14
[58] Field of Search ............... 350/96.12, 96.13, 96.14, 350/96.15; 356/345

[56] References Cited

U.S. PATENT DOCUMENTS

| | | | |
|---|---|---|---|
| 3,993,400 | 11/1976 | Leib | 350/96.15 |
| 4,340,272 | 7/1982 | Papuchon et al. | 350/96.14 |
| 4,648,686 | 3/1987 | Segawa | 350/96.13 |
| 4,648,687 | 3/1987 | Yoshida et al. | 350/96.13 |
| 4,737,002 | 4/1988 | Boucouvalas | 350/96.13 |
| 4,738,502 | 4/1988 | Mikami et al. | 350/96.13 |
| 4,753,505 | 6/1988 | Mikami et al. | 350/96.13 |
| 4,786,130 | 11/1988 | Georgiou et al. | 350/96.15 |
| 4,787,741 | 11/1988 | Udd et al. | 356/345 X |
| 4,830,448 | 5/1989 | Okazaki et al. | 350/96.13 |
| 4,859,059 | 8/1989 | Bobb et al. | 356/345 |
| 4,878,723 | 11/1989 | Chen et al. | 350/96.14 |

FOREIGN PATENT DOCUMENTS

| | | | |
|---|---|---|---|
| 57-185418 | 11/1982 | Japan | 350/96.14 |
| 58-58524 | 4/1983 | Japan | 350/96.13 |
| 2086072 | 5/1982 | United Kingdom | 350/96.14 |

OTHER PUBLICATIONS

Electronics Letters, Hung, et al.; 1 Sep. 88, vol. 24; No. 18, pp. 1184 and 1185.
Electronics Letters, 27 Oct. 88, vol. 24, No. 22, p. 1365.

Primary Examiner—John D. Lee

[57] ABSTRACT

An optical switch for switching light from one leg of an optical circuit to another leg is characterized by an arrangement for altering the index of refraction of one of the legs with respect to the other leg. This results in a disparity in light velocity and a change in phase relationship for the light being propagated through the legs. When the legs are brought into a coupling region, there occurs a predetermined transfer of light from one leg to the other, depending upon the magnitude of the alteration in phase relationship between the light propagated in the legs.

26 Claims, 14 Drawing Sheets

OPTICAL SWITCH HAVING A PHASE CHANGE REGION THEREIN

FIELD OF THE INVENTION

This invention relates to an optical switch, and in particular, to an optical switch which is able to be formed in an integrated optic network.

DESCRIPTION OF THE PRIOR ART

Optical circuits require switches for switching light from one optical path to another. There are generally known two types of such optical switches, viz., mechanical switches and solid state optronic switches.

Mechanical switching arrangements are typically physically large as compared to the optical circuit in which they are used and are thus not amenable to association into integrated optical circuits. Such switches are susceptible to physical wear and mechanical shock. They are relatively costly to manufacture. Due to their inherent lack of precision mechanical switches are generally suitable only for applications involving multimode optical fibers having large core diameters, typically on the order of approximately fifty to one hundred micrometers.

A mechanical switch useful in an optical circuit having a single mode optical fiber is disclosed and claimed in the copending application Ser. No. 07/262,935, filed Oct. 20, 1988, U.S. Pat. No. 4,911,520. The mechanical switch that is the subject of that application is designed for inexpensive yet highly accurate manufacture and utilizes a flapper fabricated of a material that avoids the imprecision associated with other prior art mechanical switches so that it may be employed with single mode fibers, wherein the core is on the order of nine micrometers.

Solid state optronic switches are available which are useful for very high speed operation (picosecond switching times) with single mode fibers. These switches are typically implemented in crystalline materials such as lithium niobate ($LiNbO_3$) or potassium titanyl phosphate (KTP). The crystal material used in such switches is expensive to grow and to process. Such crystalline switches are not amenable to incorporation into integrated optical circuits.

Recently optic devices and single mode waveguides have been implemented in photohardenable films and layers. Such films and layers are described and claimed in copending applications Ser. No. 07/144,002, U.S. Pat. No. 4,883,743, and Ser. No. 07/144,003, abandoned, both filed Jan. 15, 1988, in the names of Booth and Marchegiano and both assigned to E. I. Du Pont de Nemours and Company, Incorporated. These films and layers are amenable to use for integrated optic networks.

A light beam phase modulator for an optical fiber in which a change in temperature is used to change the phase of a light beam passing through the fiber to produce an interferometer is described in Ser. No. 07/145,020, filed Jan. 13, 1988, U.S. Pat. No. 4,859,059, available from NTIS under accession number AD-D013 717. This device does not utilize photohardenable films and layers and is not amenable to incorporation into integrated optical circuits.

In view of the foregoing it is believed advantageous to provide a switch that is able to be inexpensively formed as a part of an integrated optical circuit formed from such photohardenable films and layers and which is able to switch light carried in single mode optical waveguides formed in the photohardenable films and layers.

SUMMARY OF THE INVENTION

The present invention relates to a switch for switching light between a first and a second leg of an optical waveguide pattern formed in a photohardenable film. The switching is effected by altering the index of refraction of the optical waveguide pattern in a localized portion of at least one leg of the pattern with respect to the other leg to cause a phase shift to occur between the light conducted therein. The magnitude of the phase shift causes a corresponding predetermined transfer of light from one leg to the other in a separate region of the switch.

When the phase relationship between the light in the legs is altered such that the light in one of the legs leads the light in the other of the legs by $\pi/2$ radians and the legs are brought together in a coupling region there occurs a complete transfer of light from the leading leg to the other leg. However, when the phase relationship between the legs is altered such that the light in one of the legs leads the light in the other of the legs by $\pi$ radians there occurs a one-half transfer of light from each leg to the other leg. Intermediate changes in the phase relationship of the light in the legs result in corresponding percentages of light transfer between the legs. In accordance with one embodiment of the invention the phase shift may be accomplished using thermal means, such as a resistance heater or Peltier device.

It also lies within the contemplation of the invention to accomplish the phase shift by altering the refractive index of the material of the photohardenable film in the vicinity of one or both legs by disposing orientable molecules in one or more zones disposed about one or both legs. The orientable molecules may be disposed in the waveguide pattern itself. The orientable molecules may be of the type so as to physically reorient themselves in response to an applied field, or they may be of the type in which the electron cloud of the molecule is reoriented in response to an applied field. When the molecules are in a first orientation light is able to be conducted through the leg of the waveguide at a first velocity. When the molecules are in a second orientation light is conducted through the leg of the waveguide at a second, different, velocity. Means for reorienting the molecules in the selected zone from the first orientation to the second orientation is provided, thereby altering the phase relationship between light carried in the legs by a predetermined amount so that, in the coupling region, there occurs a corresponding predetermined transfer of light from one leg to the other. The reorienting means is operative such that when the phase relationship between the legs is altered such that the light in one of the legs leads the light in the other of the legs by $\pi/2$ radians there occurs a complete transfer of light from the one, leading, leg to the other leg. However, if the phase relationship between the legs is altered such that the light in one of the legs leads the light in the other of the legs by $\pi$ radians there occurs a one-half transfer of light from each leg to the other leg.

BRIEF DESCRIPTION OF THE DRAWINGS

The invention will be more fully understood from the following detailed description thereof, taken in connection with the accompanying drawings, which form a part of this application and in which.

DETAILED DESCRIPTION OF THE INVENTION

Figure 1:
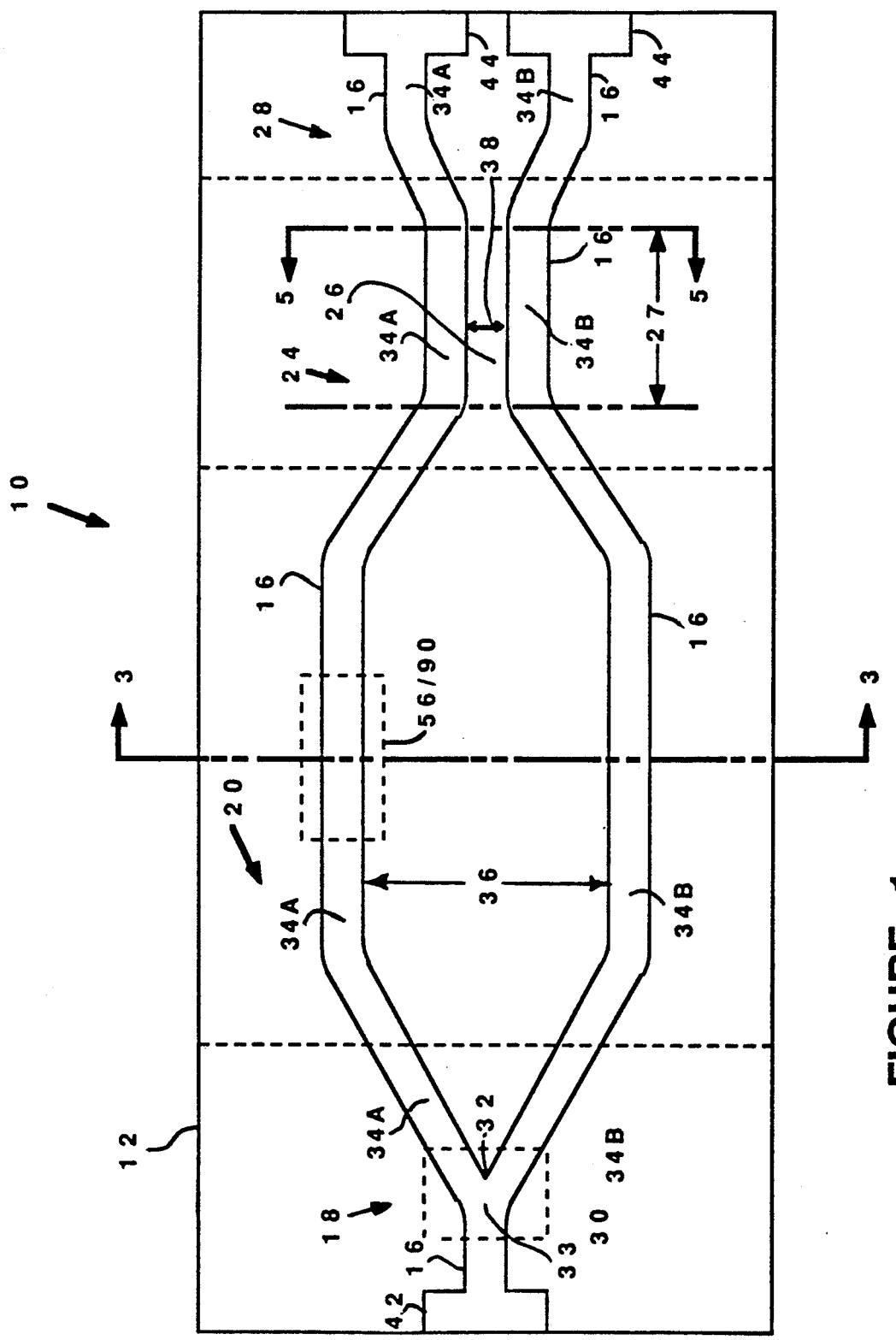
FIG. 1 is a plan view of an integrated optical switch in accordance with the present invention realized in a photohardenable film material.

Throughout the following detailed description similar reference numerals refer to similar elements in all Figures of the drawings.

Figure 2:
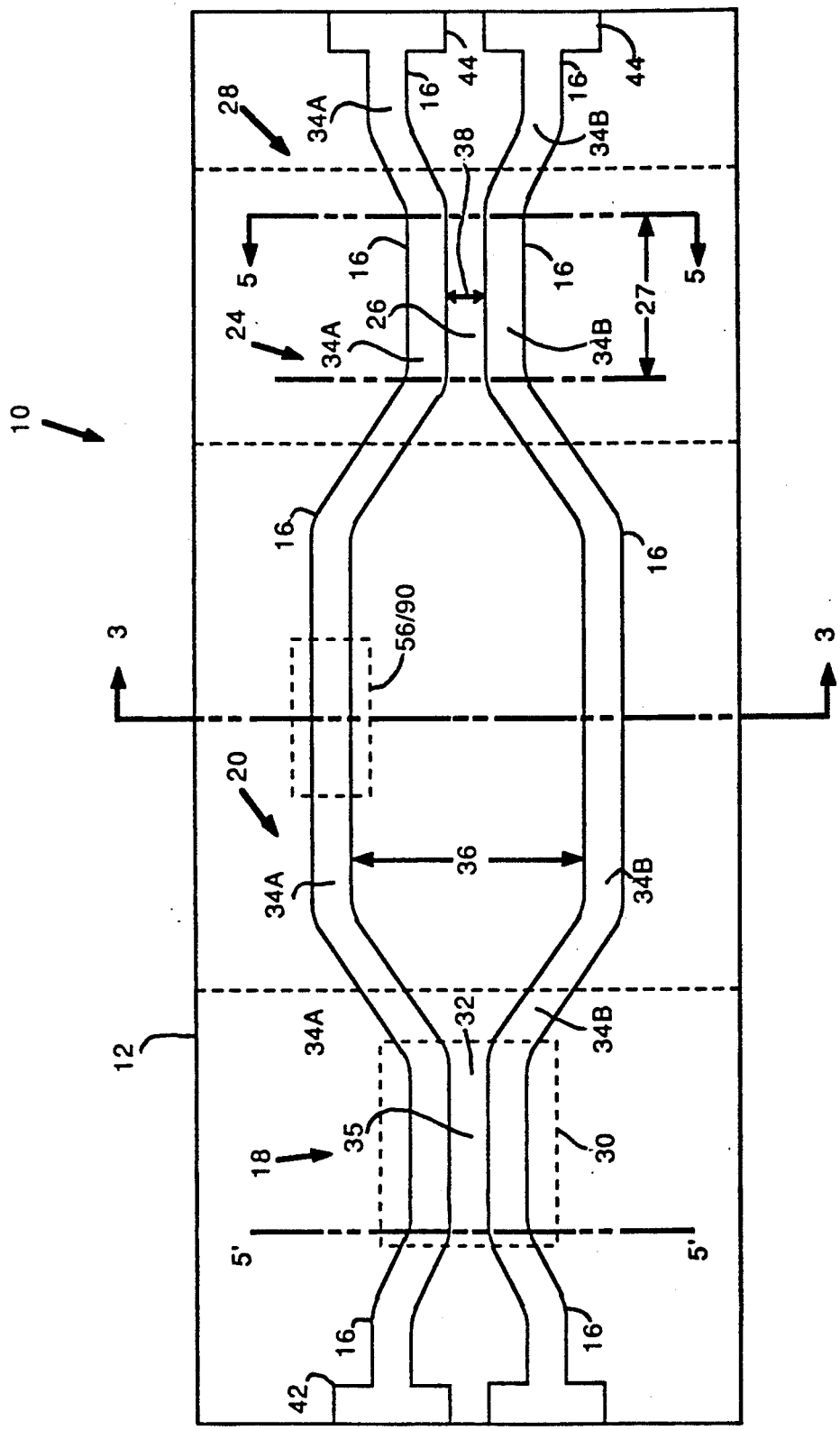
FIG. 2 is a plan view of a 2×2 coupler in accordance with the present invention realized in a photohardenable film material.
Figure 3:
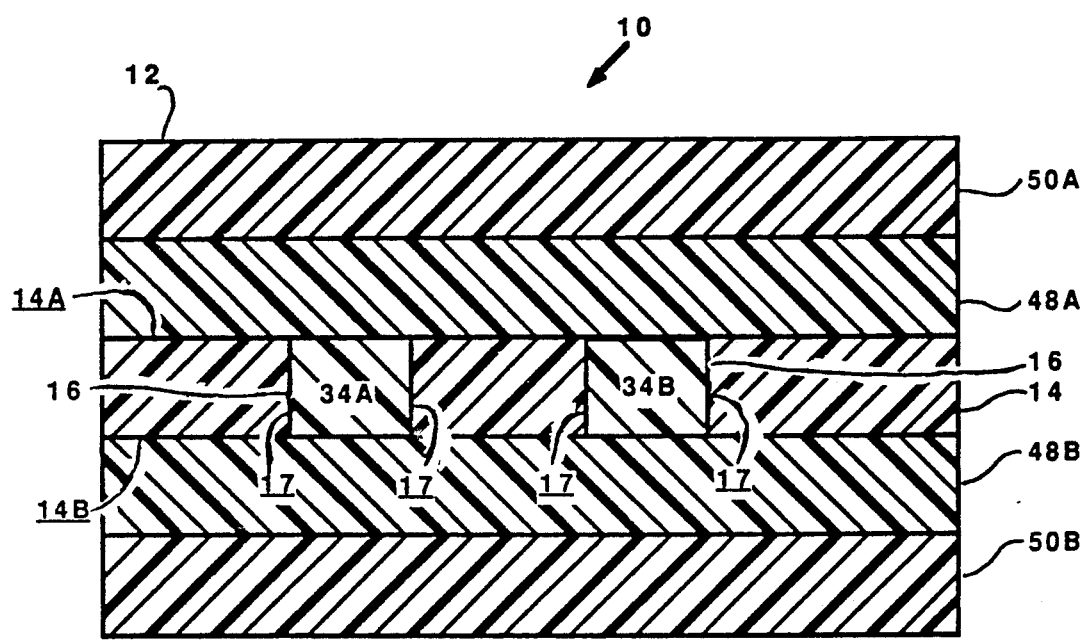
FIG. 3 is a side elevational view, entirely in section, of an integrated optical switch as shown in FIG. 1 or of a 2×2 coupler as shown in FIG. 2, both taken along section lines 3—3 therein.

With reference to FIGS. 1 and 3 shown respectively is a plan view and a side sectional view of an integrated optical switch generally indicated by reference character 10 in accordance with the present invention. An alternate embodiment of the switch 10 is illustrated in FIG. 2. The switch 10 is realized in a composite element 12 formed of a predetermined number of layers of photohardenable film materials. The element 12 in which the switch 10 is formed may itself be part of an overall integrated optical network implemented of such photohardenable materials.

The element 12 includes a base layer 14 (FIG. 3) in which a channeled waveguide 16 is formed. It should be noted that in FIGS. 1 and 2 the waveguide 16 is shown in solid lines for clarity of illustration. As will be developed the channeled waveguide 16 has a predetermined pattern associated therewith which defines predetermined operational regions of the switch 10. The base layer 14 has a first, upper, surface 14A and a second, lower, surface 14B thereon. The waveguide 16 defines a volume in the base layer 14 bounded by the surfaces 14A, 14B thereof and by lateral boundaries 17. The material in the waveguide 16 exhibits an index of refraction that differs from the index of the remainder of the base layer 14 by an amount sufficient to guide light by total internal reflection (typically an index difference on the order of 0.005 to 0.060 greater than the index of the base layer). However, the difference is not greater than an amount necessary to propagate the light as a single mode. To couple effectively to an optical fiber the waveguide 16 should have dimension that permits mode matching to the optical fiber, typically six to nine (6 to 9) micrometers in width and six (6) micrometers in thickness (assuming a respective parabolic index profile and a step function index profile dependence for these directions). The thickness of the base layer 14 generally equals the thickness dimension of the waveguide 16. Accordingly, the difference in the indices of the waveguide 16 and the surrounding portion of the base layer 14 to propagate the light as a single mode is typically on the order of 0.008.

As mentioned earlier, and as may be better seen in FIGS. 1 and 2, the switch 10 includes an input region 18 followed sequentially by a phase change region 20, an evanescent coupling region 24, and a separation, or output, region 28. The evanescent coupling region 24 includes an evanescent coupler 26 having an effective length 27.

The input region 18 includes means 30 for forming for a branch 32 in the waveguide 16, thereby defining a first leg 34A and a second leg 34B. The legs 34A, 34B remain separated by predetermined clearance distances 36 and 38 as the legs pass respectively through the phase change region 20 and the evanescent coupling region 24. The evanescent coupler 26 that is incorporated into the switch 10 must be configured (i.e., spacing and length) such that light propagating in only one of the legs will, when that light reaches the coupling region 24, be split fifty percent-fifty percent into the other leg. This property of the coupler is the basis for the one-half transfer switching action of the switch 10 to be described.

The means 30 for forming the branch 32 in the waveguide 16 includes a Y-branch 33, illustrated in FIG. 1, which is a progressive widening of the channelled waveguide leading to a split. The details of a Y-branch are set forth in copending application Ser. No. 07/297,641, filed Jan. 13, 1989 and assigned to E. I. Du Pont de Nemours and Company, Incorporated. As shown in FIG. 2 the branching means 30 may alternatively take the form of another evanescent coupler 35 (identical in property to the coupler 26), in which case the pattern of the channeled waveguide pattern 16 takes the form of a 2×2 coupler. In the embodiment of FIG. 2, light may be launched into the switch 10 from either the region 18 or the region 28. In addition, the means 30 may take the form of a diffraction grating, or any other mechanism for providing the appropriate split of light. A diffraction grating suitable for use as the branching means is also disclosed in the copending application Ser. No. 07/297,641, filed Jan. 13, 1989. By whatever means chosen a predetermined percentage of light launched into the region 18 is split by the branching means 30 into each of the legs 34A, 34B.

Coupling means 42 and 44 are disposed respectively in the input region region 18 and the separation region 28 for coupling these respective regions 18 and 28 to an optical circuit. The means 42 and/or 44 may take any of a variety of forms. To couple the switch 10 (FIG. 1 or 2) to a glass optical fiber the coupling means 42 and/or 44 may take the form of a butt coupling, an ablated groove, or an end fire coupling. The means 42 and/or 44 may also take the form of a diffraction grating for coupling either to an optical fiber or to another grating in another photohardenable film or to another waveguide within the same film layer. Yet further, the coupling means may simply take the form of a continuation of the channeled waveguide in the same film layer within which the switch 10 is disposed.

As seen in FIG. 3 a first buffer layer 48A and a second buffer layer 48B are respectively disposed on the first surface 14A and on the second surface 14B of the film layer 14. The first buffer layer 48A and the second buffer layer 48B are disposed in respective positions above and below the legs 34A, 34B of the waveguide 16 and extend beyond the lateral boundaries 17 of the waveguide 16 so that the optical properties of the waveguide 16 are not affected by changes in the surroundings of the switch 10. The layers 48A and 48B are hereinafter at times collectively referred to by the reference character 48. Typically the buffer layers extend beyond the lateral boundaries 17 by at least ten (10) micrometers. For ease of manufacturability and to insure the structural integrity of the switch it is preferred that the buffer layers be laminated over the entire upper and lower surfaces 14A, 14B of the base layer 14. For additional structural integrity one or more additional buffer layers, diagrammatically at 50A, 50B, may be added above and below the layers 48A, 48B, if desired. The layers 50A and 50B are hereinafter at times collectively referred to by the reference character 50. The layers 48 (and 50, if desired) may exhibit any predetermined thickness, typically on the order of thirty (30) micrometers. Typically the waveguide 16 has a refractive index in the range from 0.001 to 0.025 greater than that of the adjacent buffer layer. In the preferred cases the switch 10 is defined by a three (3) layer laminate of base layer 14 and buffer layers 48 or a five (5) layer laminate of base layer 14 and buffer layers 48 and 50.

The photohardenable base and buffer layers used herein are thermoplastic compositions which upon exposure to actinic radiation form crosslinks or polymers of high molecular weight to change the refractive index and rheological character of the composition(s). Preferred photohardenable materials are photopolymerizable compositions, such as disclosed in U.S. Pat. No. 3,658,526 (Haugh) and more preferred materials are described in copending application Ser. Nos. 07/144,355 (U.S. Pat. No. 4,942,112), 07/144,281 (abandoned) and 07/144,840 (abandoned), all filed Jan. 15, 1988 and all assigned to E. I. Du Pont de Nemours and Company, Incorporated. In these materials, free radical addition polymerization and crosslinking of a compound containing one or more ethylenically unsaturated groups, usually in a terminal position, hardens and insolublizes the composition. The sensitivity of the photopolymerizable composition is enhanced by the photoinitiating system which may contain a component which sensitizes the composition to predetermined radiation sources, e.g., visible light. Conventionally a binder is the most significant component of a substantially dry photopolymerizable base or layer in terms of what physical properties the base or layer will have while being used in the invention. The binder serves as a containing medium for the monomer and photoinitiator prior to exposure, provides the base line refractive index, and after exposure contributes to the physical and refractive index characteristics needed for the base layer of buffer layer. Cohesion, adhesion, flexibility, diffusibility, tensile strength, in addition to index of refraction are some of the many properties which determine if the binder is suitable for use in the base layer or the buffer layer.

Dry base or layer photohardenable elements contemplated to be equivalent are photodimerizable or photocrosslinkable compositions such as disclosed in U.S. Pat. No. 3,526,504 (Celeste) or those compositions in which hardening is achieved by a mechanism other than the free radical initiated type identified above.

While the photopolymerizable base or layer is a solid sheet of uniform thickness it is composed of three major components, a solid solvent soluble preformed polymeric material, at least one liquid ethylenically unsaturated monomer capable of addition polymerization to produce a polymeric material with a refractive index substantially different from that of the preformed polymeric material, or binder, and a photoinitiator system activatable by actinic radiation. Although the base or layer is a solid composition, components interdiffuse before, during and after imaging exposure until they are fixed or destroyed by a final uniform treatment usually by a further uniform exposure to actinic radiation. Interdiffusion may be further promoted by incorporation into the composition of an otherwise inactive plasticizer.

In addition to the liquid monomer, the composition may contain solid monomer components capable of interdiffusing in the solid composition and reacting with the liquid monomer to form a copolymer with a refractive index shifted from that of the binder.

In the preferred compositions for use as the base layer 14 or buffer layers 48, 50 in this invention, the preformed polymeric material and the liquid monomer are selected so that either the preformed polymeric material or the monomer contains one or more moieties taken from the group consisting essentially of substituted or unsubstituted phenyl, phenoxy, naphthyl, naphthyloxy, heteroaromatic groups containing one to three aromatic rings, chlorine, and bromine and wherein the remaining component is substantially free of the specified moieties. In the instance when the monomer contains these moieties, the photopolymerizable system hereinafter is identified as a "Monomer Oriented System" and when the polymeric material contains these moieties, the photopolymerizable system hereinafter is identified as a "Binder Oriented System."

The stable, solid, photopolymerizable compositions preferred for this invention will be more fully described by reference to the "Monomer Oriented System" and "Binder Oriented System." The Mononer Oriented System is preferred for the base layer 14.

The monomer of the Monomer Oriented System is a liquid, ethylenically unsaturated compound capable of addition polymerization and having a boiling point above 100° C. The monomer contains either a phenyl, phenoxy, naphthyl, naphthoxy, heteroaromatic group containing one to three aromatic rings, chlorine or bromine. The monomer contains at least one such moiety and may contain two or more of the same or different moieties of the group, provided the monomer remains liquid. Contemplated as equivalent to the groups are substituted groups where the substitution may be lower alkyl, alkoxy, hydroxy, carboxy, carbonyl, amino, amido, imido or combinations thereof provided the monomer remains liquid and diffusable in the photopolymerizable layer.

Preferred liquid monomers for use in the Monomer Oriented System of this invention are 2-phenoxyethyl acrylate, 2-phenoxyethyl methacrylate, phenol ethoxylate acrylate, 1-(p-chlorophenoxy) ethyl acrylate, p-chlorophenyl acrylate, phenyl acrylate, 1-phenylethyl acrylate, di(2-acryloxyethyl) ether of bisphenol-A, and 2-(2-naphthyloxy) ethyl acrylate.

While monomers useful in this invention are liquids, they may be used in admixture with a second solid monomer of the same type, e.g., N-vinyl-carbazole, ethylenically unsaturated carbazole monomers such as disclosed in *Journal of Polymer Science: Polymer Chemistry Edition*, Vol. 18, pp. 9–18 (1979) by H. Kamagawa et al., 2-naphthyl acrylate, penta-chlorophenyl acrylate, 2,4,6-tribromophenyl acrylate, and bisphenol A diacrylate, 2-(2-naphthyloxy) ethyl acrylate, and N-phenyl maleimide.

The solvent soluble polymeric material or binder of the Monomer Oriented System is substantially free of phenyl, phenoxy, naphthyl, naphthyloxy, heteroaromatic group containing one to three aromatic rings, chlorine and bromine.

Preferred binders for use in the Monomer Oriented System of this invention are cellulose acetate butyrate polymers; acrylic polymers and inter polymers including polymethyl methacrylate, methyl methacrylate/methacrylic acid and methyl methacrylate/acrylic acid copolymers, terpolymers of methylmethacrylate/C$_2$-C$_4$ alkyl acrylate or methacrylate/acrylic or methacrylic acid; polyvinyl-acetate; polyvinyl acetal, polyvinyl butyral, polyvinyl formal; and as well as mixtures thereof.

The monomer of the Binder Oriented System is a liquid ethylenically unsaturated compound capable of addition polymerization and having a boiling point above 100° C. The monomer is substantially free of moieties taken from the group consisting essentially of phenyl, phenoxy, naphthyl, naphthyloxy, heteroaromatic group containing one to three aromatic rings, chlorine and bromine.

Preferred liquid monomers for use in Binder Oriented Systems of this invention include decanediol diacrylate, iso-bornyl acrylate, triethylene glycol diacrylate, diethyleneglycol diacrylate, triethylene glycol dimethacrylate, ethoxyethoxyethyl acrylate, triacrylate ester of ethoxylated trimethylolpropane, and 1-vinyl-2-pyrrolidinone.

While monomers used in Binder Oriented Systems are liquids, they may be used in admixture with a second solid monomer of the same type, e.g., N-vinyl-caprolactam.

The solvent soluble polymeric material or binder of the Binder Oriented System contains in its polymeric structure moieties taken from the group consisting essentially of phenyl, phenoxy, naphthyl naphthyloxy or heteroaromatic group containing one to three aromatic rings as well as chloro or bromo atoms. Contemplated as equivalent to the groups are substituted groups where the substitution may be lower alkyl, alkoxy, hydroxy, carboxy, carbonyl, amido, imido or combinations thereof provided the binder remains solvent soluble and thermoplastic. The moieties may form part of the monomeric units which constitute the polymeric binder or may be grafted onto a preprepared polymer or interpolymer. The binder of this type may be a homopolymer or it may be an interpolymer of two or more separate monomeric units wherein at least one of the monomeric units contains one of the moieties identified above.

Preferred binders for use in the Binder Oriented System include polystyrene, poly (styrene/acrylonitrile), poly(styrene/methyl methacrylate), and polyvinyl benzal as well as admixtures thereof.

The same photoinitiator system activatable by actinic radiation may be used in either the Monomer Oriented System or the Binder Oriented System. Typically the photoinitiator system will contain a photoinitiator and may contain a sensitizer which extends the spectral response into the near U.V. region and the visible spectral regions.

Preferred photoinitiators include CDM-HABI, i.e., 2-(o-chlorophenyl)-4,5-bis(m-methoxyphenyl)-imidazole dimer; o-Cl-HABI, i.e., 1,1'-Biimidazole, 2,2'-bis-(o-chlorophenyl)-4,4', 5,5'-tetraphenyl-; and TCTM-HABI, i.e., 1H-Imidazole, 2,5-bis(o-chlorophenyl)-4-3,4-dimethoxyphenyl-, dimer each of which is typically used with a hydrogen donor, e.g., 2-mercaptobenzoxazole.

Preferred sensitizers include the following:

DBC, i.e., Cyclopentanone, 2,5-bis-((4-(diethylamino)-2-methylphenyl)methylene);

DEAW, i.e., Cyclopentanone, 2,5-bis-((4-(diethylamino)-phenyl)methylene); and

Dimethoxy-JDI, i.e., 1H-Inden-1-one, 2,3-dihydro-5,6-dimethoxy-2-((2,3,6,7-tetrahydro-1H,5H-benzo[i,j]quinolizin-9-yl)-methylene)-.

The solid photopolymerizable compositions of this invention may contain a plasticizer. Plasticizers of this invention may be used in amounts varying from about 2% to about 20% by weight of the compositions preferably 5 to 15 wt. %.

Preferred plasticizers for use in simple cellulose acetate butyrate systems are triethyleneglycol dicaprylate, tetraethyleneglycol diheptanoate, diethyl adipate, Brij ®30 and tris-(2-ethylhexyl)phosphate. Similarly, triethyleneglycol dicaprylate, diethyl adipate, Brij ®30, and tris-(2-ethylhexyl)phosphate are preferred in "Monomer Oriented Systems" where cellulose acetate butyrate is the binder.

Other components in addition to those described above can be present in the photopolymerizable compositions in varying amounts. Such components include: ultraviolet radiation absorbing material, thermal stabilizers, hydrogen donors, oxygen scavengers and release agents.

Amounts of ingredients in the photopolymerizable compositions will generally be within the following percentage ranges based on total weight of the photopolymerizable layer: monomer, 5–50%, preferably 15–35%; initiator 0.1–10%, preferably 1–5%; binder, 25–75%, preferably 45–65%; plasticizer, 0–25%, preferably 5–15%; other ingredients 0–5%, preferably 1–4%.

The supports can be any substance transparent to actinic radiation that provides sufficient support to handle the combined base and layer. Preferably the support is transparent to light in the spectral region of 0.6 through 1.6 micrometers wavelengths. The term "support" is meant to include natural or synthetic supports, preferably one which is capable of existing in a flexible or rigid film or sheet form. For example, the support or substrate could be a sheet or film of synthetic organic resin, or a composite of two or more materials. Specific substrates include polyethylene terephthalate film, e.g., resin-subbed polyethylene terephthalate film, flame or electrostatic discharge treated polyethylene terephthalate film, glass, cellulose acetate film, and the like. The thickness of the supports has no particular importance so long as it adequately supports the film or layer removably adhered to it. A support thickness of about twenty-five (25) to fifty (50) micrometers using polyethylene terephthalate provides sufficient rigidity.

In accordance with one aspect of the present invention there is provided in the phase change region 20 of the switch 10 illustrated in FIGS. 1 and 2 means generally indicated by reference character 56 for changing the temperature of at least a selected one of the legs 34A a predetermined amount in a predetermined direction. Owing to the strong temperature dependence of the refractive index of the photohardenable materials used as the layer 14 and the buffer layer(s) 48 (or 50, if provided), a small temperature change can effect a large change in the refractive index (approximately $-3 \times 10^{-4}/°C$.) and in the velocity of light propagated in the waveguide. As a result the phase relationship between the light carried in the legs 34A, 34B is altered by a predetermined amount. Thus, in the coupling region 24, there occurs a corresponding predetermined transfer of light from one leg to the other leg. For a polymeric material such as that used in the base layer 14 a temperature change (heating) in the range of one to three degrees Centigrade (1° to 3° C.) for a one to three millimeter (1 to 3 mm.) length of the leg 34A is preferred. If heating and cooling are performed simultaneously (FIG. 4E) heating (and cooling) in the range one-half to one-and-one-half degrees Centigrade ($\frac{1}{2}$° to 1-$\frac{1}{2}$° C.) for one-half to one-and-one-half millimeters ($\frac{1}{2}$ to 1-$\frac{1}{2}$ mm.) of each leg 34A, 34B is preferred.

Figure 4A:
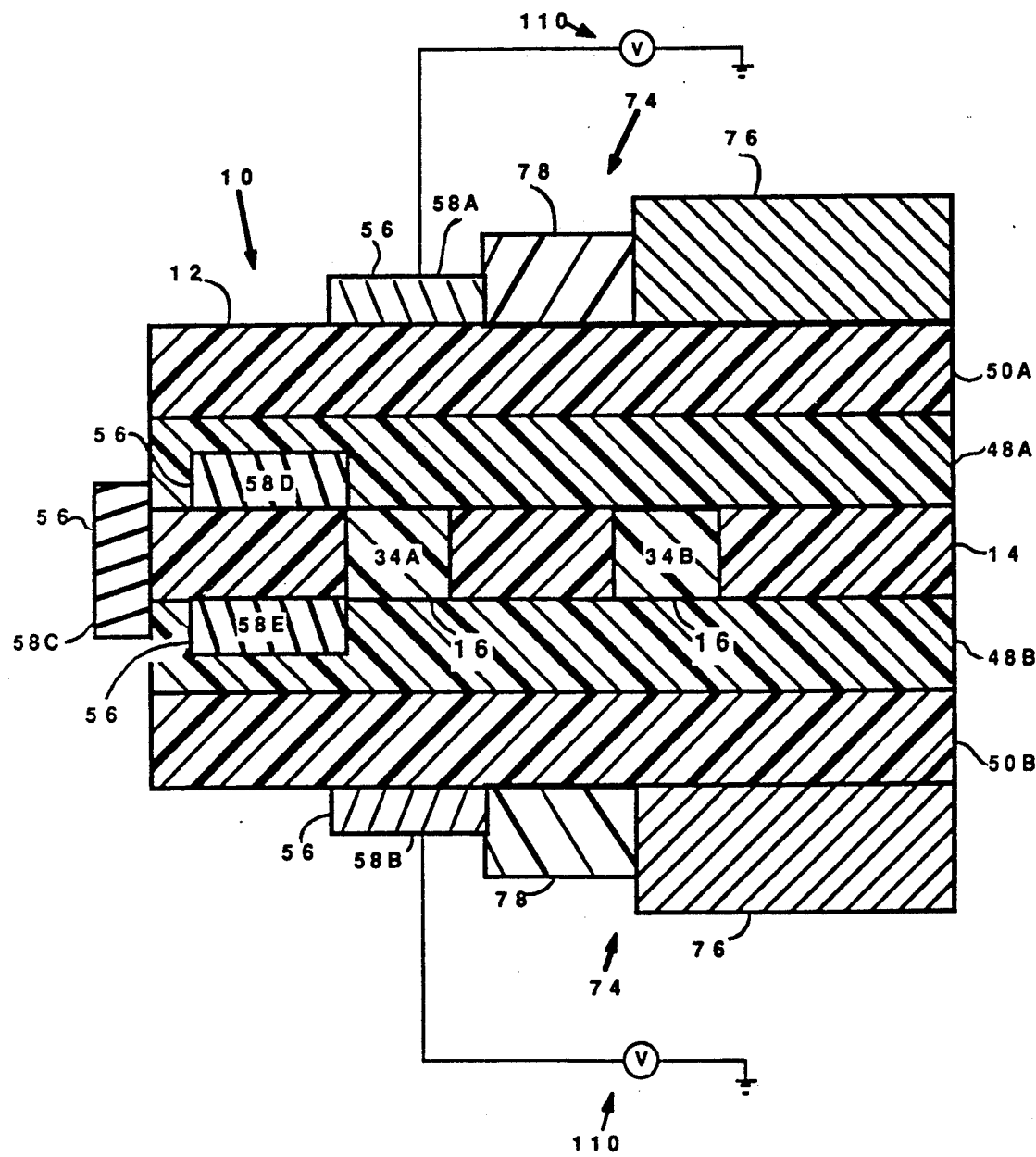
FIGS. 4A, 4B, 4C, 4D and 4E are diagrammatic representations of the locations of various forms of thermal means for effecting a change in phase in light conducted through different legs of the waveguide of the integrated optical switch shown in FIG. 1 or of a 2×2 coupler as shown in FIG. 2.
Figure 4:
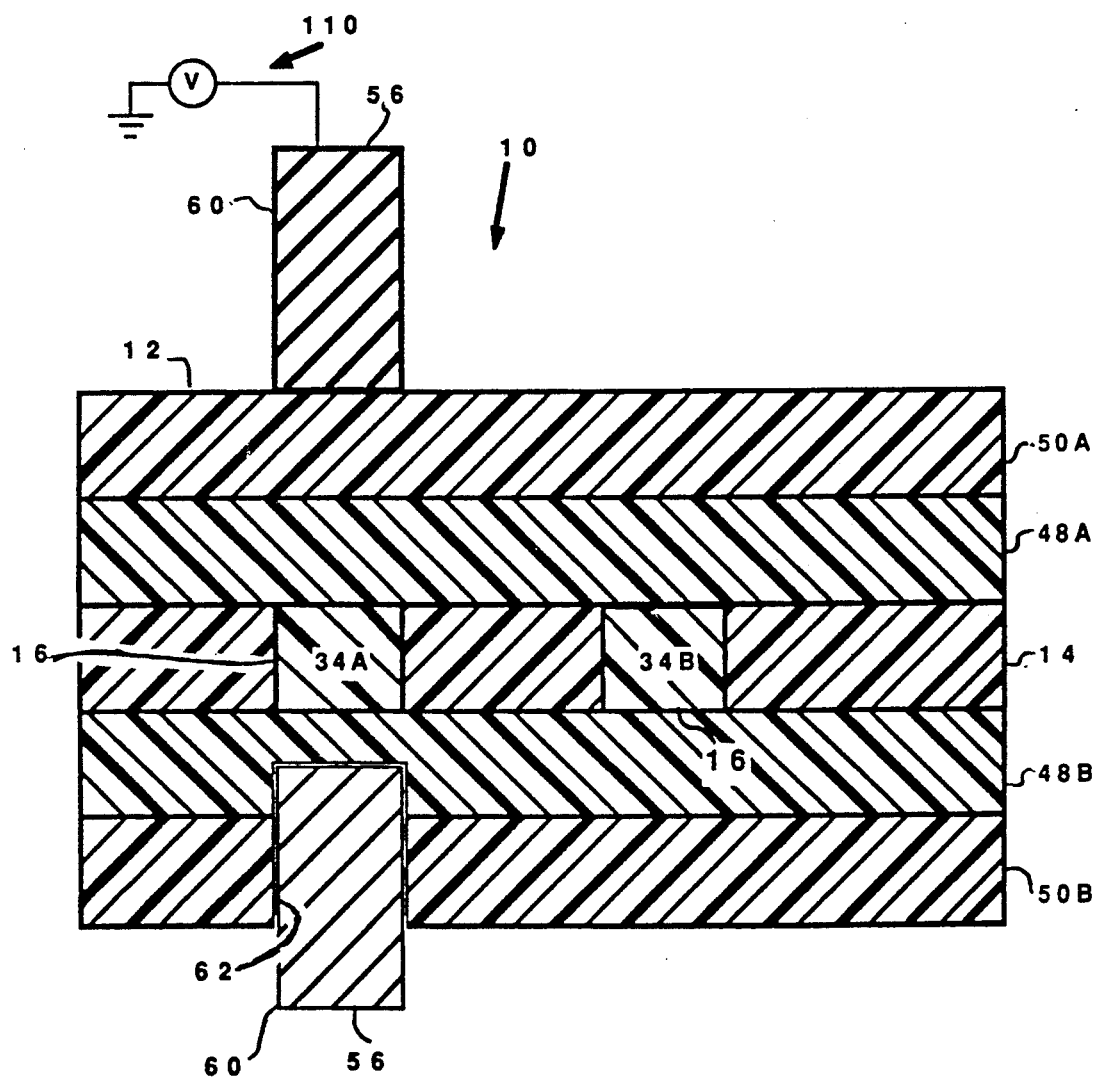
Figure 4:
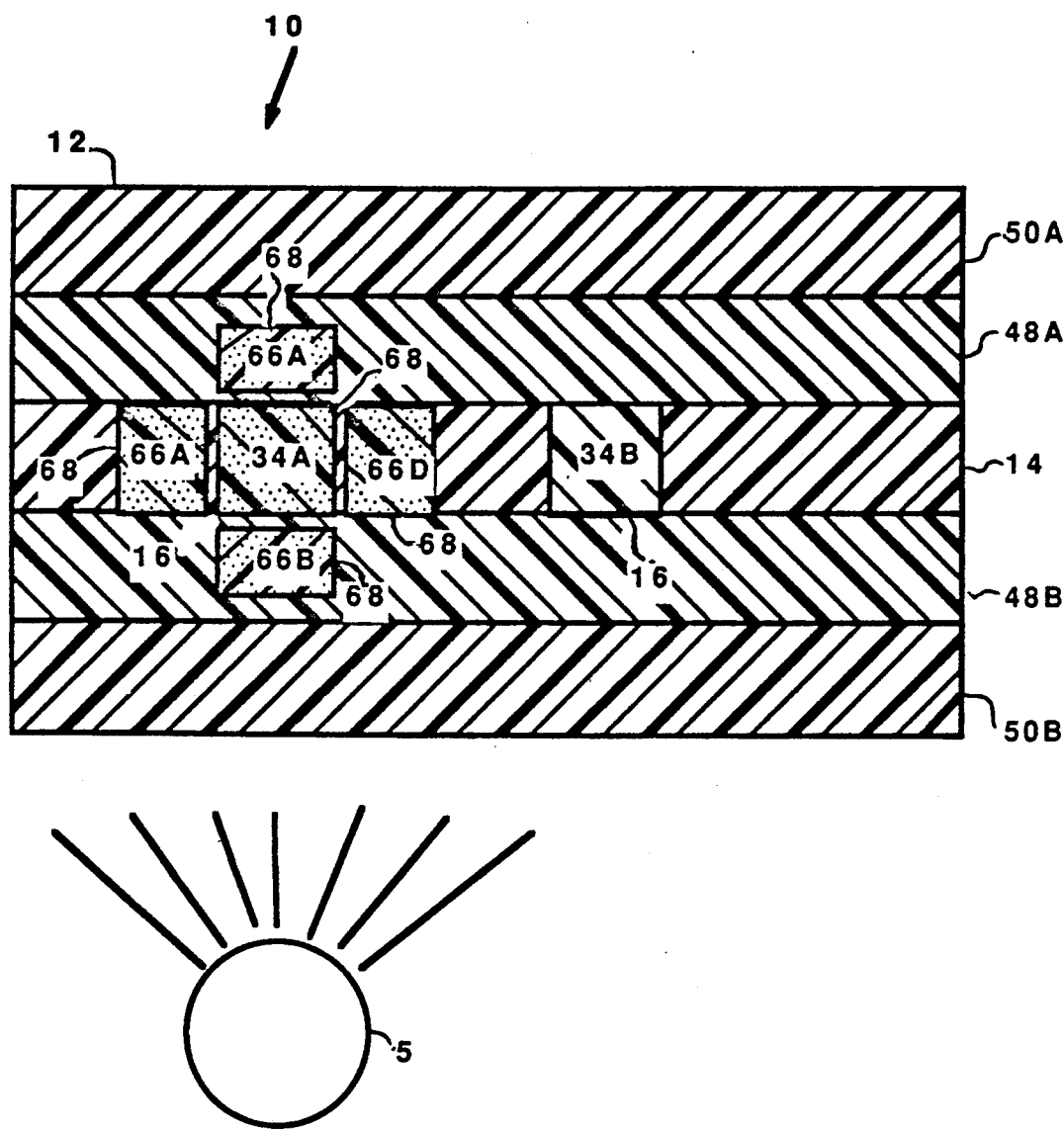
Figure 4:
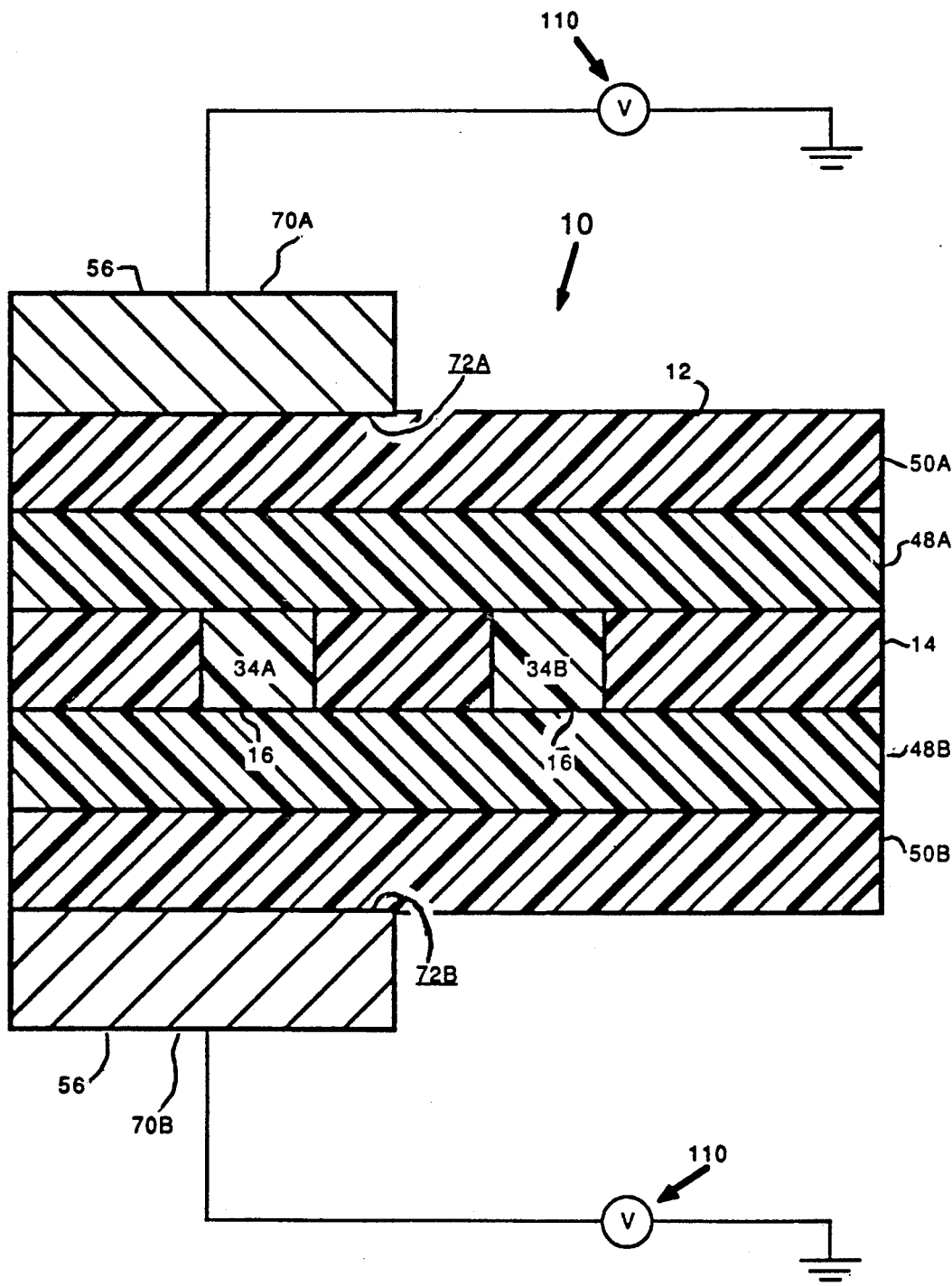
Figure 4:
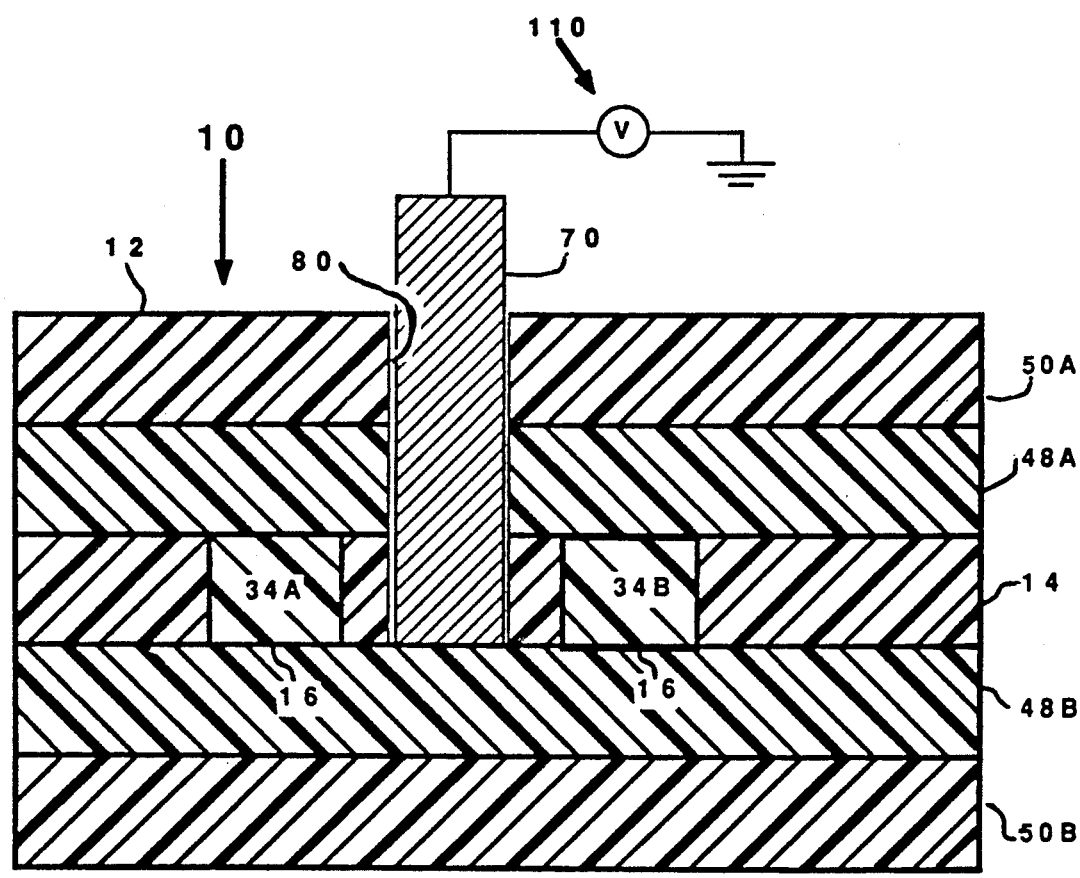

The means 56 may take any of a variety of forms. As seen in FIG. 4A, in one embodiment the means 56 take the form of one or more resistance heater(s), indicated in the drawings by the character 58 followed by a suffix. The heater(s) 58 may be positioned at any of a variety of positions on the switch 10. For example the heater(s) 58A, and/or 58B may be screen printed or otherwise disposed on the outermost surface of one or both of the the buffer layers 48 (or 50, if provided) above the selected leg 34A of the waveguide 16. Alternatively or additionally, the resistance heater 58C may be screen printed on the side of the base layer 14 in a location that is not in contact with the waveguide 16. Alternatively or additionally, the resistance heater(s) 58D and/or 58E may be screen printed on the surfaces 14A, 14B of the base layer 14 in a location that does not affect the propagation of light in the waveguide 16.

As a yet further alternative, as shown in FIG. 4B, the means 56 for changing temperature could be effected by a probe 60 which may be placed on the surface of one of the buffer layers 48 (or 50, if provided) over the leg 34A. Alternatively or additionally, the probe 60 may extend through an opening 62 in the buffer layer 48 (or 50, if provided) into proximity to the leg 34A of waveguide 16.

As a yet further alternative, as shown in FIG. 4C, at least one or, preferably, a plurality of zones 66A through 66D may be defined in one or both of the buffer layer(s) 48A, 48B and/or in the base layer 14 adjacent to the selected one of the legs 34A of the waveguide 16. In the zones 66 are disposed molecules 68 having a absorption spectrum at a predetermined wavelength that is matched to the output of a predetermined source S of radiation. The molecules 68 absorb energy from the source S and thereby heat the surrounding material. Suitable for use as the molecules 68 are dye molecules such as rhodamines. The predetermined source S of radiation may be implemented using a visible laser. Alternatively or additionally, the molecules 68 could be inserted into the leg 34A of the waveguide 16 so long as these molecules 68 do not significantly absorb or scatter light propagating through the waveguide 16. Again, suitable for use as the molecules 68 in the waveguide 16 are rhodamines dye molecules.

Yet alternatively, as seen in FIG. 4D, the means 56 for changing temperature can take the form of one or more Peltier elements 70A, 70B mounted above and/or below the leg 34A of the waveguide 16 in positions generally similar to the positions occupied by the resistance heaters 58A, 58B, respectively, (FIG. 4A). Each surface 72A, 72B of the Peltier elements 70A, 70B may be operated in either a heating or cooling mode to change the temperature of the leg 34A. Use of a Peltier element 70A (and/or 70B) could effect more rapid switching since reversal of the current in the element changes the surface 72A (and/or 72B) of the element 70A (and/or 70B) in contact with the switch 10 from heating to cooling or from cooling to heating, thus effecting a more rapid temperature change.

If any of the expedients heretofore listed (FIGS. 4A to 4D) are used to define the means 56, the other of the legs 34B must be maintained at a constant temperature so that the temperature difference between the legs 34A, 34B is maintained substantially constant. To effect this end a heat sink 74 (shown only in FIG. 4A) is placed above and/or below the other leg 34B in contact with the buffer layer 48 (or 50, if present). The heat sink 74 includes a metal or heat conductive jacket 76 that is thermally insulated by an insulator 78 from the means 56. It is, of course, understood that the heat sink 74 is correspondingly located if the forms of the means 56 shown in FIGS. 4B through 4D is used.

With reference now to FIG. 4E, if it is not desired to use a heat sink 74 or if it is desired to maximize the switching speed of the switch 10, the Peltier element 70 is disposed in the clearance distance 36 between the legs 34A, 34B. The Peltier element 70 extends through an opening 80 in the buffer layer 48A (and 50A, if present). The opening 80 may, if desired, alternatively be disposed in the other buffer layer 48B (and 50B, if present). The Peltier element 70 can be operated in such a fashion that one of the legs 34A, 34B is heated while the other leg 34B, 34A, respectively, as the case may be, is simultaneously cooled.

However the means 56 (FIGS. 4A through 4E) is implemented light launched into the input region 18 of the waveguide 16 branches at the Y-branch 33 (FIG. 1) or the evanescent coupler 35 (FIG. 2) into the first leg 34A and the second leg 34B. A predetermined percentage (preferably a fifty percent split) of light launched into the input region 18 splits into each of the legs 34A, 34B. In the phase change region 20, where the means 56 is located, the temperature of the selected leg 34A is changed by a predetermined amount in a predetermined direction. As may be appreciated from the foregoing the means 56 is operative to effect a predetermined change in the temperature of one of the legs 34A with respect to the other of the legs, either by heating or by cooling (FIGS. 4A to 4D), or by simultaneously changing the temperature in one of the legs by a predetermined amount in one direction and in the other of the legs in an opposite direction (FIG. 4E). However accomplished, owing to the temperature dependence of the index of the material the phase relationship between the light carried in the legs 34A, 34B is altered by a predetermined amount. As a result, when the light enters the coupling region 24, there occurs a corresponding predetermined transfer, or switching, of light from one leg to the other.

Figure 5A:
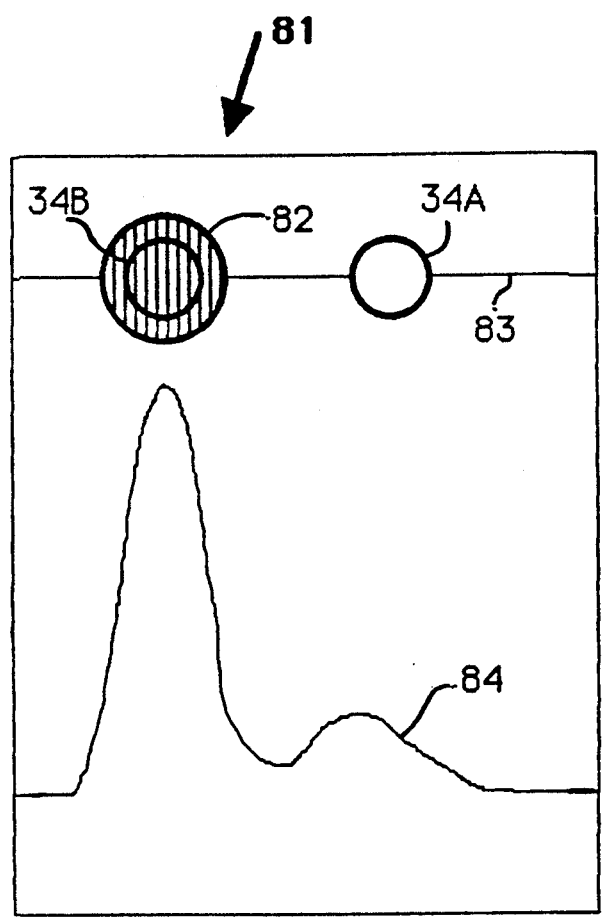
FIGS. 5A, 5B and 5C are diagrammatic representations of photographs of the near field view at the output of the evanescent coupling region of the integrated optical switch indicated along line 5—5 in FIGS. 1 and 2 illustrating three different switch states.
Figure 5B:
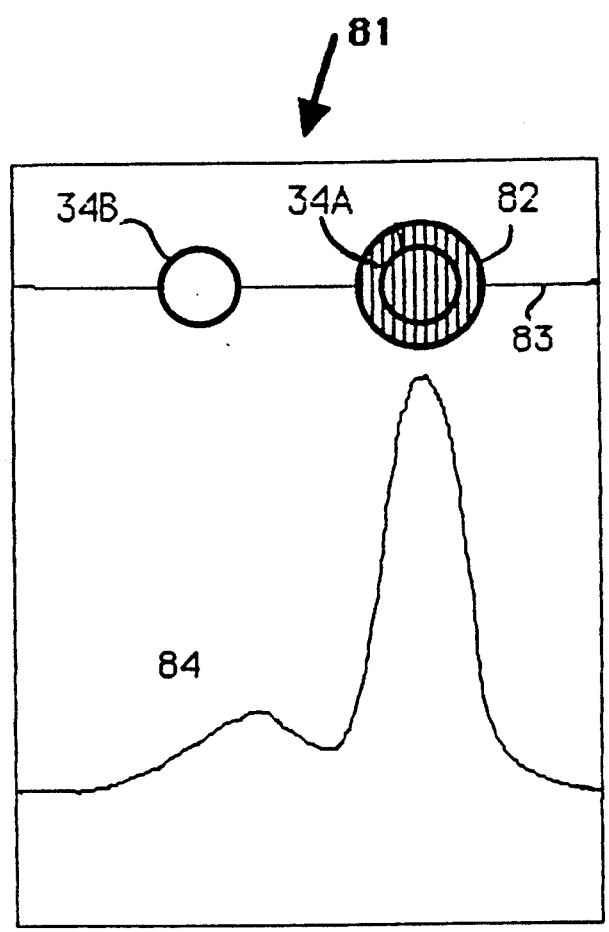
Figure 5C:
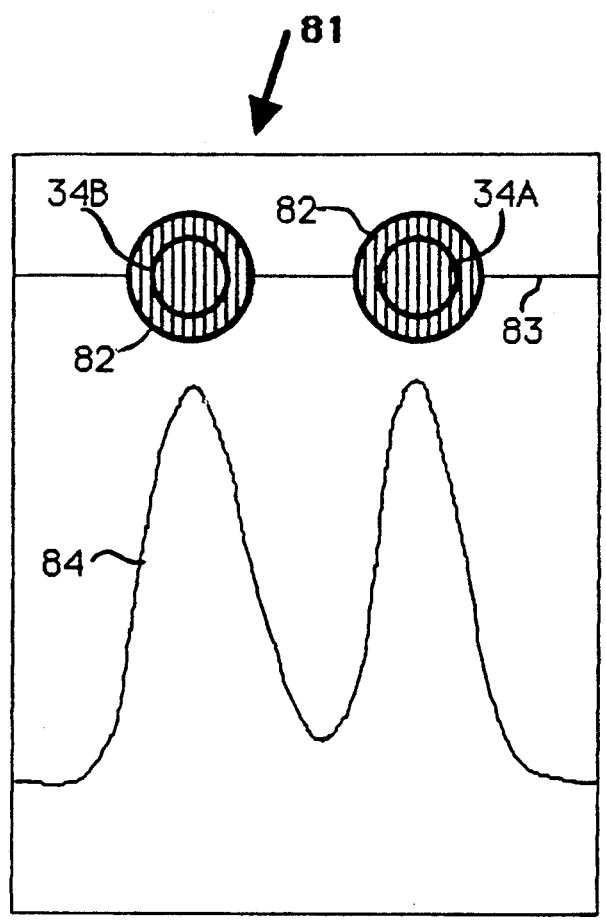

The effect of thermally altering the phase relationship of the light propagating in the legs 34A, 34B of the switch 10 (FIGS. 1 or 2) is illustrated in FIGS. 5A through 5C. FIGS. 5A, 5B and 5C are diagrammatic representations of photographs of the single mode near field view at the output of the evanescent coupling region of the integrated optical switch indicated along line 5—5 in FIGS. 1 and 2 illustrating three different switch states. (It is noted that a representation of the outputs of the switch states along the lines 5'—5' (FIG. 2) if the 2×2 coupler switch of FIG. 2 is implemented (with the region 28 as the input and the region 18 as the output) is not illustrated, but an analagous switching effect to that illustrated in FIGS. 5A through 5C occurs.) A representation of a camera output along the reference line 5—5 is indicated generally by reference character 81. The shaded region 82 represents a region of high light intensity. A line 83 across the center of the shaded region 82 was analyzed by a vertical line scanner and the output 84 of the vertical line scanner is displayed in FIGS. 5A through 5C.

When the phase relationship between the legs is altered such that the light in one of the legs e.g., the leg 34A, leads the light in the other of the legs (e.g., the leg 34B) by $\pi/2$ radians there occurs a complete transfer of light from the one, leading, leg 34A to the other leg 34B (FIG. 5A). The situation extant when the light in the leg 34B leads the light in the leg 34A is depicted in FIG. 5B. In this instance a complete transfer of light from the leading leg, here the leg 34B, to the lagging leg, the leg 34A, occurs. It should, of course, be understood that if the phase relationship between the legs is altered such that the light in one of the legs e.g., the leg 34A, leads the light in the other of the legs (e.g., the leg 34B) by $[N(2\pi)+(\pi/2)]$ radians (where N is an integer) there occurs the complete transfer of light from the one, leading, leg 34A to the other leg 34B (FIG. 5A).

As seen in FIG. 5C, when the phase relationship between the legs 34A, 34B is altered such that the light in either one of the legs leads the light in the other of the legs by $\pi$ radians there occurs a one-half transfer of light from each leg to the other leg. Intermediate changes in the phase relationship of the light in the legs result in corresponding intermediate percentages of light transfer between the legs. Similarly, it should be understood that if the phase relationship between the legs is altered such that the light in one of the legs e.g., the leg 34A, leads the light in the other of the legs (e.g., the leg 34B) by (N $\pi$) radians (where N is an integer) there occurs the one-half transfer of light from each leg to the other.

EXAMPLE

This example illustrates a thermally controlled optical switch in accordance with the present invention.

To form the base layer 14 a substantially dry photohardenable film about six (6) micrometers thick, having the ingredients listed in Table I, coated onto a twenty-five (25) micrometers thick clear polyethylene terephthalate support, in approximately three (3) inch by four (4) inch section, is exposed to broad band ultraviolet light in the spectral range three hundred fifty (350) to four hundred (400) nanometers through the chrome-plated glass photomask, thereby to form the waveguide pattern 16. The waveguide 16 is six (6) micrometers in width. The clearance distance 36 in the phase change region 20 is about one (1) millimeter, while the clearance distance 38 in the evanescent coupling region 24 is about three (3) micrometers. The effective length 27 of the evanescent coupler 26 is six hundred nineteen (619) micrometers. The exposure conditions are: intensity, about six (6) milliWatts/cm$^2$; total exposure, about ten (10) milliJoules/cm$^2$; and temperature about thirty-eight degrees Centigrade (38° C.)

To add the buffer layer 48A after about five (5) minutes the mask is removed and a substantially dry photohardenable (buffer) layer of about thirty (30) micrometers thick, having the ingredients listed in Table II, coated on a twenty five (25) micrometers thick clear polyethylene terephthalate support, is laminated to the film surface 14A over the waveguide pattern. The polyethylene terephthalate support film support is removed by mechanical stripping and a second photohardenable (buffer) layer of identical composition and structure as the first buffer layer, with support, is laminated to the opposite surface 14B of the base layer 14 to form the buffer layer 48B.

The resultant member (polyethylene terephthalate support, buffer layer 48A, base layer 14, buffer layer 48B, polyethylene terephthalate support) is allowed to stand for about fifteen (15) minutes at room temperature, about twenty three to twenty five degrees Centigrade (23°-25° C.) A first side of the resultant member is flooded at about thirty eight degrees Centigrade (38° C.) with about two thousand (2000) milliJoules/cm$^2$ broad band ultraviolet light in the spectral range three hundred fifty to four hundred (350 to 400) nanometers and flooding repeated on the second side.

To form the buffer layers 50A and 50B the polyethylene terephthalate support is removed from a first side of the resultant member and a substantially dry photohardenable (buffer) layer of about thirty (30) micrometers thick, having the ingredients listed in Table III, coated on a twenty five (25) micrometers thick clear polyethylene terephthalate support, is laminated to the buffer layer and the process repeated for the second side of the member. The resultant member (polyethylene terephthalate support, buffer layer 50A, buffer layer 48A, base layer 14, buffer layer 48B, buffer layer 50B, polyethylene terephthalate support) is exposed at about thirty eight degrees Centigrade (38° C.) to four hundred (400) milliJoules/cm$^2$ broad band ultraviolet light in the spectral range three hundred fifty to four hundred (350 to 400) nanometers on each side.

Removal of the buffer layer supports forms the composite element 12 having a buried channel waveguide 16. The resultant element 12 is allowed to stand under a fluorescent lamp for about one (1) hour to bleach the sensitizing dye and heated at one hundred degrees Centigraded (100° C.) for sixty (60) minutes to achieve thermal stability. The ends of the element 12 are cut and polished for about fifteen (15) minutes using colloidal silica.

Single mode thirteen hundred (1300) nanometer wavelength light is launched into a polished edge of the composite element 12. The light source is a laser diode directed through a greater than ten (10) meter length of Sumitomo Z fiber, commercially available from Sumitomo Ltd., Osaka, Japan. The phase change region of one leg 34A of the element 12 is heated by running two (2) volts through a seven (7) ohm Nichrome wire held in contact the surface of the element 12 above the leg 34A of the waveguide. The wire defines a resistive heater element 58A. A temperature change of about one to three degrees Centigrade (1° to 3° C.) over about three millimeters (3 mm) of the leg 34A is produced.

The output light from the legs 34A, 34B of the element 12 is collected with a Nikon 100X lens with an numerical aperture (NA) of 0.9 and captured with a Model C2741 Hamamatsu IR camera (Hamamatsu Photonic Systems, Bridgewater, N.J.). FIGS. 5A, 5B and 5C are diagrammatic representations of photographs of the near field view at the output of the evanescent coupling region of the integrated optical switch indicated along line 5—5 in FIG. 1 illustrating three different switch states. The camera output is displayed on a Panasonic WV-5490 video modulator. In FIG. 5 the camera output is indicated generally by reference character 81. The shaded region 82 represents a region of high light intensity.

A line 83 across the center of the shaded region 82 was analyzed by a Model 321 Colorado Video, Inc., vertical line scanner and the output 84 of the vertical line scanner displayed simultaneously on the video modulator.

TABLE I
BASE LAYER

| Ingredient | Weight % |
| --- | --- |
| Cellulose acetate butyrate[1] | 56.54 |
| Phenoxyethyl acrylate | 35.00 |
| Triethyleneglycol dicaprylate | 5.00 |
| o-Cl HABI[2] | 1.00 |
| 2-Mercaptobenzoxazole | 1.89 |
| Sensitizing dye (DEAW)[3] | 0.56 |
| 2,6-Di-t-butyl-4-methylphenol (BHT) | 0.01 |

[1]Eastman type CAB 531-1
[2]1,1'-bis-Biimidazole, 2,2'-bis-o-chlorophenyl-4,4',5,5'-tetraphenyl; CAS 1707-68-2
[3]2,5-Bis-([4-(diethylamino)-phenyl]methylene) cyclopentanone

TABLE II
BUFFER LAYER

| Ingredient | Weight % |
| --- | --- |
| Poly(vinylacetate), MW 500,000, CAS 9003-20-7 | 66.04 |
| Phenol ethoxylate monoacrylate, CAS 56641-05-5 | 17.02 |
| Ethoxylated bis-phenol A diacrylate, CAS 24447-78-7 | 3.00 |
| N-Vinyl carbazole | 7.94 |
| o-Cl-HABI[1] | 3.69 |
| 4-Methyl-4H-1,2,4-triazole-3-thiol, CAS 24854-43-1 | 2.09 |
| FC-430[2] | 0.19 |
| Sensitizing dye (DEAW)[3] | 0.03 |

[1]1,1'-bis-Biimidazole, 2,2'-bis-o-chlorophenyl-4,4',5,5'-tetraphenyl, CAS 1707-68-2
[2]Fluoroaliphatic polymeric esters, 3M Company, St. Paul, MN
[3]2,5-Bis-([4-(diethylamino)-phenyl]methylene) cyclopentanone

TABLE III
BUFFER LAYER

| Ingredient | Weight % |
| --- | --- |
| Cellulose acetate butyrate[1] | 57.11 |
| Phenoxyethyl acrylate | 38.00 |
| o-Cl HABI[2] | 3.00 |
| 2-Mercaptobenzoxazole | 1.89 |

[1]Eastman type CAB 531-1
[2]1,1'-bis-Biimidazole, 2,2'-bis-o-chlorophenyl-4,4',5,5'-tetraphenyl; CAS 1707-68-2

In addition to the foregoing, it lies within the contemplation of the invention to alter the phase relationship between the light in one of the legs 34A with respect to the light in the other leg 34B by other mechanisms. To this end, in accordance with the alternate embodiment of the present invention illustrated in FIGS. 6A and 6B, the buffer layers 48A and/or 48B have defined therein respective molecule reorienting portions 90 in the same general location in the phase change region 20 in which the means 56 is disposed. The molecule reorienting portions 90 of the phase change region 20 include zones 92A and 92B adjacent the leg 34A of the waveguide 16. Alternatively or additionally, the base layer 14 may have zones 92C or 92D therein adjacent the leg 34A of the waveguide 16.

Reorientable molecules 98 are disposed in at least a selected one of the zones 92A through 92D. The zones 92 may be hereinafter at times collectively referred to by the character 92. Alternatively, or additionally, molecules 98 may be disposed in the leg 34A if desired so long as these molecules 98 do not significantly absorb or scatter the light propagating through the waveguide 16.

In accordance with the present invention the molecules 98 disposed in the selected zone(s) 92 can be either liquid crystal molecules, electro-optic molecules, or a mixture of both types of molecules. A liquid crystal molecule is reorientable in the sense that the molecule physically reorients itself in the zone(s) 92 in which it is disposed in response to an applied electric or magnetic field. An electro-optic molecule is reorientable in the sense that the electron cloud of the molecule is reorientable in response to an applied electric field. Suitable for use as the electro-optic molecules are m-nitroaniline, p-nitroaniline, 2-methyl-4-nitroaniline, merocyanine dyes, 4-dimethylamino-4'-nitrostilbene (DANS). Also usable are PC6S, a pendant side chain polymer, and C22, a proprietary electro-optic material material, both developed by Hoechst-Celanese Research Company, Somerville, N.J. Candidates for use as liquid crystal molecules are p-cyanoalkoxybiphenyls as well as 5-cholestanyl oleate and similar esters, so long as the molecules are compatible with the materials of the base layer 14 and/or the buffer layers 48.

For ease of manufacture the molecules 98 may be added to the coating solution for the base layer 14 or the buffer layers 48A, 48B, prior to coating. Alternatively or additionally, molecules 98 can be introduced into zone(s) 92 by solvent diffusion. For maximum effectiveness the electro-optic molecules 98 should be aligned. The molecules 98 are alignable by applying poling fields, preferably at a temperature at or above the glass transition point ($T_g$) of hardened buffer layers 48A, 48B, such as described in J. I. Thackara, et al., *Appl. Phys. Lett.*, 52, 1031–1033, 1988.

When the molecules 98 occupy a first orientation light is able to be conducted at a first velocity through the leg 34A of the waveguide 16. Alternately, when the molecules 98 occupy a second orientation light is conducted through that leg of the waveguide at a second, different, velocity.

Means generally indicated by reference character 100 is provided for reorienting the molecules 98 in the selected zone(s) 92 (and/or in the leg 34A of the waveguide 16, if there provided) from the first orientation to the second orientation thereby altering the phase relationship between light carried in the leg 34A with respect to the light in the other leg 34B by a predetermined amount. As a result, in the coupling region 24, for a given alteration of phase relationship between the light propagating in the legs 34A and 34B, there occurs a corresponding predetermined transfer of light from one leg to the other, all resulting in effects similar to the switching effects discussed earlier (FIGS. 5A through 5C).

Figure 6:
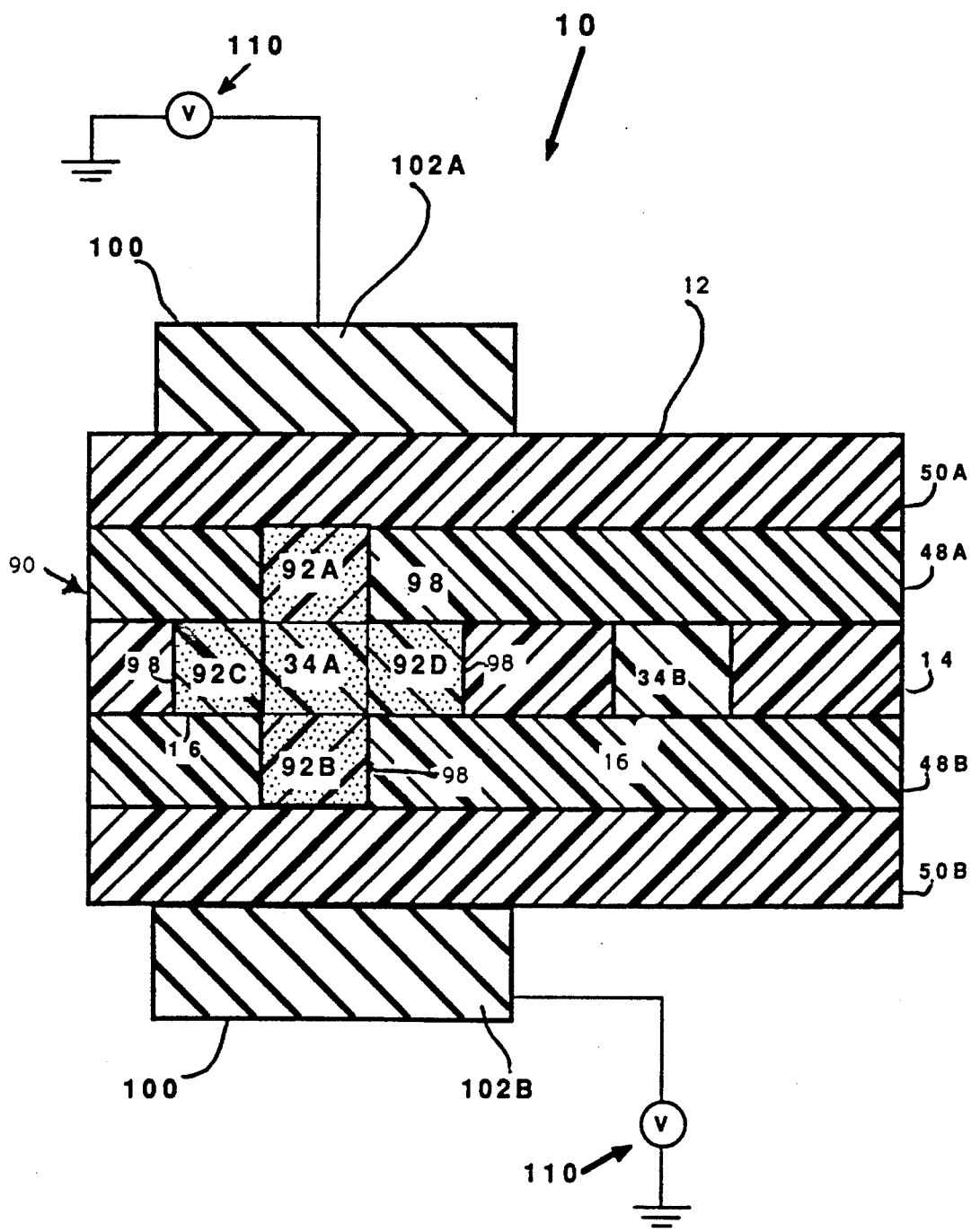
FIGS. 6A, 6B and 6C are diagrammatic representations of the locations of various forms of reorienting means for reorienting molecules disposed in predetermined locations within the switch of FIG. 1 for effecting a change in phase in light conducted through different legs of the waveguide of the integrated optical switch shown in FIG. 1 or of the 2×2 coupler switch as shown in FIG. 2.
Figure 6:
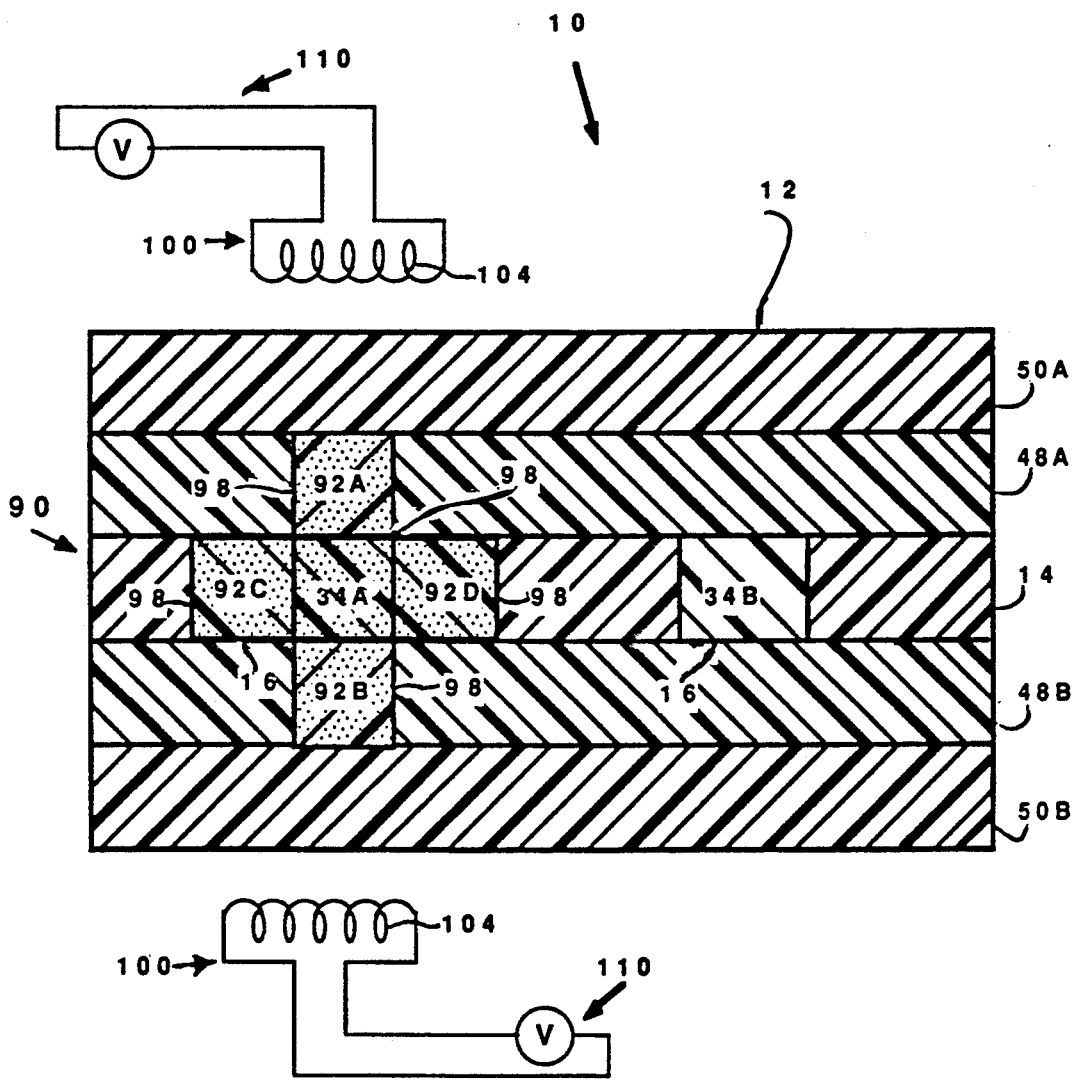
Figure 6C:
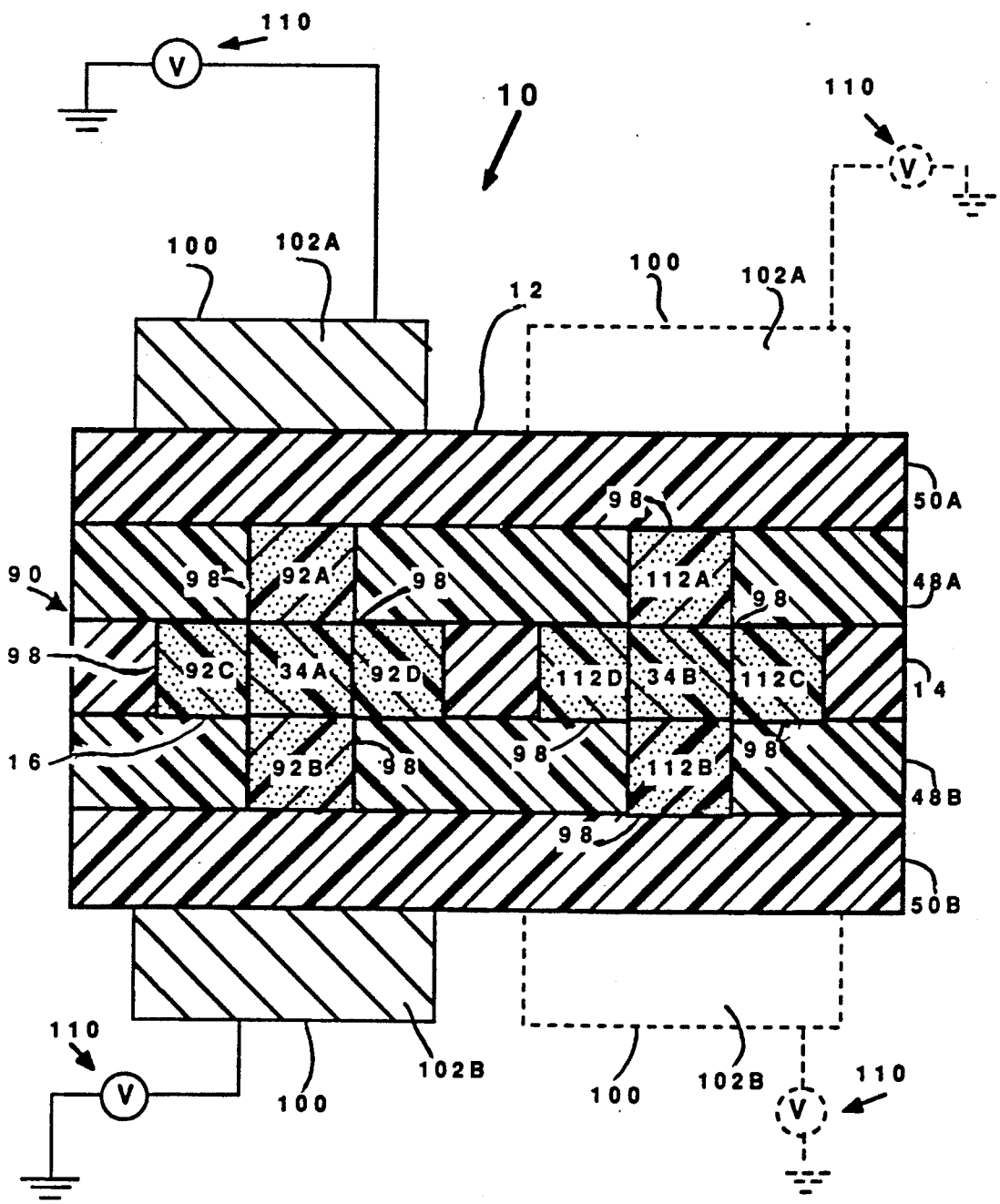

The reorienting means 100 may take any one of a plurality of forms. For example, as shown in FIG. 6A, the means 100 may be implemented by a pair of electrodes 102A, 102B, respectively disposed above and below the zone(s) 92 in which the molecules are disposed. Electrodes may be used if the molecules take the form of either liquid crystal molecules or electro-optic molecules.

Alternatively or additionally, as seen in FIG. 6B, the means 100 may be implemented by a magnetic coil 104 disposed proximal to the zone(s) in which the liquid crystal molecules are disposed. As is indicated in FIGS. 4A, 4B, 4D, 4E, and 6A through 6C, the various forms of the temperature change means 56 and the reorienting means 100 are each connected to a suitable source of electrical potential, as schematically indicated at reference character 110 in the Figures.

In accordance with a yet further aspect of the second embodiment of the invention, zones 112A through 112D, analogous to the zones 92A through 92D, respectively, may be provided about the leg 34B. Reorientable molecules 98 may be disposed in at least one or more selected zones 112 and/or in the leg 34B of the waveguide 16.

In accordance with this aspect of the invention, when the molecules 98 in the zone(s) 92 adjacent the first leg 34A (or in the leg 34A) are in a first orientation, light is able to be conducted through the first leg 34A at a first velocity, and when the molecules 98 in the zone(s) 92 adjacent the first leg 34A (or in the leg 34A) are in a second orientation, light is conducted through the first leg 34A of the waveguide at a second velocity that differs from the first velocity by an amount $+\Delta 1$.

Correspondingly, when the molecules 98 in the zone(s) 112 adjacent the second leg 34B (or in the leg 34B itself) are in a first orientation, light is able to be conducted through the second leg 34B at a first velocity, and when the molecules 98 in the zone(s) 112 adjacent the second leg 34B are in a second orientation light is conducted through the second leg 34B at a second velocity that differs from the first velocity by an amount $-\Delta 2$. It should be appreciated that the first and second velocities of light through each leg are not necessarily equal, nor are the changes in velocity due to reorientation of the molecules necessarily equal. As a result, in the coupling region 24, for a given alteration of phase relationship between the light propagating in the legs 34A and 34B, there occurs a corresponding predetermined transfer of light from one leg to the other, again resulting in effects similar to the switching effects discussed earlier (FIGS. 5A through 5C).

Those skilled in the art, having the benefit of the teachings of the present invention as hereinabove set forth may effect numerous modifications thereto. It should be understood that such modifications are to be construed as lying within the scope of the present invention as defined by the appended claims.

What is claimed is:

1. An optical switch for switching light in an optical circuit comprising:
    a photohardenable film having a waveguide formed therein, the film having a first and a second surface thereon, the film forming a part of the optical circuit;
    the waveguide having an input region branching into a first and a second leg, the legs passing sequentially through a phase change region and a distinct evanescent coupling region, a predetermined percentage of light launched into the input region splitting into each of the legs;
    a first and a second buffer layer respectively disposed on the first and second surface of the film in respective positions above and below the waveguide;
    means for changing the temperature of at least a selected one of the legs in the phase change region by a predetermined amount in a predetermined direction thereby altering the phase relationship between light carried in the legs by a predetermined amount so that, in the coupling region, there occurs a corresponding predetermined transfer of light from one leg to the other.

2. The optical switch of claim 1 wherein the temperature change means is operative to change the temperature so that when the phase relationship between the legs is altered such that the light in one of the legs leads the light in the other of the legs by $\pi/2$ radians there occurs a complete transfer of light from the one leading leg to the other leg.

3. The optical switch of claim 1 wherein the temperature change means is operative to change the temperature so that when the phase relationship between the legs is altered such that the light in one of the legs leads the light in the other of the legs by $\pi$ radians there occurs a one-half transfer of light from each leg to the other leg.

4. The optical switch of claim 1 wherein the input region comprises a Y-branch.

5. The optical switch of claim 1 wherein the input region comprises an evanescent coupler.

6. An optical switch for switching light in an optical circuit comprising:
    a photohardenable film having a waveguide formed therein, the film having a first and a second surface thereon, the film forming a part of the optical circuit;
    the waveguide having an input region branching into a first and a second leg, the legs passing sequentially through a phase change region and an evanescent coupling region, a predetermined percentage of light launched into the input region splitting into each of the legs;
    a first and a second buffer layer respectively disposed on the first and second surface of the film in respective positions above and below the waveguide;
    means for changing the temperature of at least a selected one of the legs in the phase change region by a predetermined amount in a predetermined direction thereby altering the phase relationship between light carried in the legs by a predetermined amount so that, in the coupling region, there occurs a corresponding predetermined transfer of light from one leg to the other; and
    means for changing the temperature of the other leg in the phase change region by a predetermined amount in a direction opposite to the predetermined direction.

7. The optical switch of claim 6 wherein the temperature change means is operative to change the temperature so that when the phase relationship between the legs is altered such that the light in one of the legs leads the light in the other of the legs by $\pi/2$ radians there occurs a complete transfer of light from the one leading leg to the other leg.

8. The optical switch of claim 6 wherein the temperature change means is operative to change the temperature so that when the phase relationship between the legs is altered such that the light in one of the legs leads the light in the other of the legs by $\pi$ radians there occurs a one-half transfer of light from each leg to the other leg.

9. An optical switch for switching light in an optical circuit comprising:
- a film having a waveguide formed therein, the film having a first and a second surface thereon, the film forming a part of the optical circuit;
- the waveguide having an input region branching into a first and a second leg, the legs passing sequentially through a phase change region and an evanescent coupling region, a predetermined percentage of light launched into the input region splitting into each of the legs;
- a first and a second buffer layer respectively disposed on the first and second surface of the film in respective positions above and below the waveguide,
- the film and the buffer layers each having, in the phase change region, a zone that lies adjacent to at least one of the legs, at least a selected one of the zones having molecules that are orientable in predetermined directions in response to an electric field, when the molecules are in a first orientation light is able to be conducted through the leg of the waveguide at a first velocity, when the molecules are in a second orientation light is conducted through the leg of the waveguide at a second, different, velocity; and
- means for reorienting the molecules in the selected zone from the first orientation to the second orientation thereby altering the phase relationship between light carried in the legs by a predetermined amount so that, in the coupling region, there occurs a corresponding predetermined transfer of light from one leg to the other.

10. The optical switch of claim 9 wherein the reorienting means is operative such that when the phase relationship between the legs is altered such that the light in one of the legs leads the light in the other of the legs by $\pi/2$ radians there occurs a complete transfer of light from the one leading leg to the other leg.

11. The optical switch of claim 9 wherein the reorienting means is operative such that when the phase relationship between the legs is altered such that the light in one of the legs leads the light in the other of the legs by $\pi$ radians there occurs a one-half transfer of light from each leg to the other leg.

12. The optical switch of claim 9 further comprising at least one of the legs of the waveguide having, in the phase change region, molecules that are orientable in predetermined directions in response to an electric field, when the molecules are in a first orientation light is able to be conducted through the leg of the waveguide at a first velocity, when the molecules are in a second orientation light is conducted through the leg of the waveguide at a second, different, velocity,
- the reorienting means reorienting the molecules in the waveguide from the first orientation to the second orientation.

13. The optical switch of claim 9 wherein the input region comprises a Y-branch.

14. The optical switch of claim 9 wherein the input region comprises an evanescent coupler.

15. An optical switch for switching light in an optical circuit comprising:
- a film having a waveguide formed therein, the film having a first and a second surface thereon, the film forming a part of the optical circuit;
- the waveguide having an input region branching into a first and a second leg, the legs passing sequentially through a phase change region and an evanescent coupling region, a predetermined percentage of light launched into the input region splitting into each of the legs;
- a first and a second buffer layer respectively disposed on the first and second surface of the film in respective positions above and below the waveguide,
- the film and the buffer layers each having, in the phase change region, zones that lie adjacent to each of the legs, at least a selected one of the zones about each of the legs having molecules that are orientable in predetermined directions in response to an electric field,
- when the molecules in the zone adjacent the first leg are in a first orientation, light is able to be conducted through the first leg of the waveguide at a first velocity, when the molecules in the zone adjacent the first leg are in a second orientation, light is conducted through the first leg of the waveguide at a second velocity that differs from the first velocity by an amount $+\Delta 1$;
- when the molecules in the zone adjacent the second leg are in a first orientation, light is able to be conducted through the second leg of the waveguide at a first velocity, when the molecules in the zone adjacent the second leg are in a second orientation, light is conducted through the second leg of the waveguide at a second velocity that differs from the first velocity by an amount $-\Delta 2$;
- means for reorienting the molecules in each of the selected zones from the first orientation to the second orientation thereby altering the phase relationship between light carried in the legs by a predetermined amount so that, in the coupling region, there occurs a corresponding predetermined transfer of light from one leg to the other.

16. The optical switch of claim 15 wherein the reorienting means is operative such that when the phase relationship between the legs is altered such that the light in one of the legs leads the light in the other of the legs by $\pi/2$ radians there occurs a complete transfer of light from the one leading leg to the other leg.

17. The optical switch of claim 15 wherein the reorienting means is operative such that when the phase relationship between the legs is altered such that the light in one of the legs leads the light in the other of the legs by $\pi$ radians there occurs a one-half transfer of light from each leg to the other leg.

18. The optical switch of claim 15 wherein the input region comprises a Y-branch.

19. The optical switch of claim 15 wherein the input region comprises an evanescent coupler.

20. An optical switch for switching light in an optical circuit comprising:
- a film having a waveguide formed therein, the film having a first and a second surface thereon, the film forming a part of the optical circuit;
- the waveguide having an input region branching into a first and a second leg, the legs passing sequentially through a phase change region and an evanescent coupling region, a predetermined percentage of light launched into the input region splitting into each of the legs;
- a first and a second buffer layer disposed on the first and second surface of the film in respective positions above and below the waveguide,
- at least one of the legs of the waveguide having, in the phase change region, molecules that are orientable in predetermined directions in response to an electric field, when the molecules are in a first orientation light is able to be conducted through the leg of the waveguide at a first velocity, when the molecules are in a second orientation light is conducted through the leg of the waveguide at a second, different, velocity; and means for reorienting the molecules from the first orientation to the second orientation thereby altering the phase relationship between light carried in the legs by a predetermined amount so that, in the coupling region, there occurs a corresponding predetermined transfer of light from one leg to the other.

21. The optical switch of claim 20 wherein the reorienting means is operative such that when the phase relationship between the legs is altered such that the light in one of the legs leads the light in the other of the legs by $\pi/2$ radians there occurs a complete transfer of light from the one leading leg to the other leg.

22. The optical switch of claim 20 wherein the reorienting means is operative such that when the phase relationship between the legs is altered such that the light in one of the legs leads the light in the other of the legs by $\pi$ radians there occurs a one-half transfer of light from each leg to the other leg.

23. The optical switch of claim 20 wherein the input region comprises a Y-branch.

24. The optical switch of claim 20 wherein the input region comprises an evanescent coupler.

25. The optical switch of claim 6 wherein the input region comprises a Y-branch.

26. The optical switch of claim 6 wherein the input region comprises an evanescent coupler.

* * * * *